UNITED STATES PATENT OFFICE.

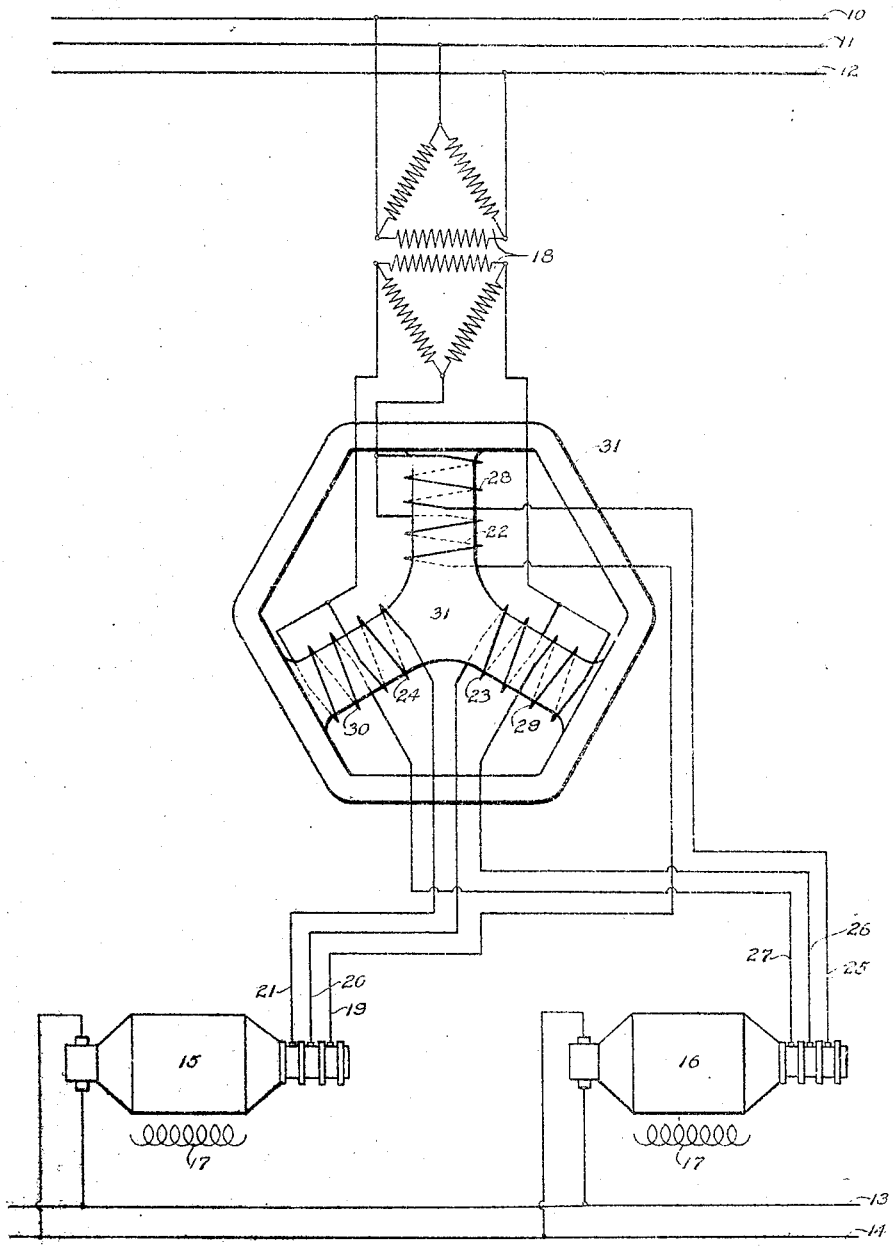

LOUIS E. BOGEN AND LOUIS C. NICHOLS, OF MILWAUKEE, WISCONSIN, ASSIGNORS, BY MESNE ASSIGNMENTS, TO ALLIS-CHALMERS MANUFACTURING COMPANY, A CORPORATION OF DELAWARE.

SYSTEM OF DISTRIBUTION.

1,150,416.  Specification of Letters Patent.  Patented Aug. 17, 1915.

Application filed May 13, 1910. Serial No. 561,207.

*To all whom it may concern:*

Be it known that we, LOUIS E. BOGEN and LOUIS C. NICHOLS, citizens of the United States, and residents of Milwaukee, in the county of Milwaukee and State of Wisconsin, have invented certain new and useful Improvements in Systems of Distribution, of which the following is a full, clear, and exact specification.

Our invention relates to systems of distribution, and particularly to the operation of a plurality of rotary converters connected in parallel both on the D. C. and the A. C. ends.

When two or more rotary converters are connected in parallel on both the D. C. and A. C. ends, it is desirable that the several converters divide the load in proportion to their respective capacities. For a number of causes the load at different times might become otherwise divided, and the converters would tend to hunt. By reason of this hunting there might arise a most undesirable surging of current between the machines.

It is the object of our invention to maintain the proportionate division of the current, and to prevent such hunting and surging.

In carrying out our invention there is provided a device which is so connected to the rotary converters that it offers a large impedance to surges of current between the machines while offering little or no impedance to the flow of current between the A. C. and D. C. circuits. This device consists of transformer windings connected in the parallel circuits between the A. C. ends of the several converters and the A. C. line, and arranged in inductive inter-relation so that they react among themselves to offer small impedance to the proportionate flow of current through the several converters between the A. C. and D. C. lines but to offer a large impedance to the flow of current from one machine to another. The inductive relation between the windings connected to the several converters is such that in case the currents taken by the different machines tend to vary disproportionately the currents traversing the several windings will so react upon one another that the proper proportion is immediately restored.

The various novel features of our invention will be apparent from the description and drawing and will be particularly pointed out in the claims.

The single figure of the drawing shows diagrammatically one embodiment of our invention.

The A. C. circuit 10—11—12 is connected to the D. C. circuit 13—14 through a plurality of rotary converters 15 and 16 in parallel with each other. These rotary converters may be of any desired type, and are here shown as three-phase machines. The fields 17 of these rotary converters may be excited in any suitable manner. The D. C. ends of the converters are connected directly to the D. C. circuit 13—14, and the A. C. ends of the machines may be either conductively or inductively connected to the A. C. circuit 10—11—12. As illustrated, they are inductively connected through the transformer 18. The three leads 19, 20, and 21 from the A. C. end of the converter 15 extend to coils 22, 23, and 24 respectively, while the leads 25, 26, and 27 from the A. C. end of the converter 16 extend to coils 28, 29, and 30 respectively. The ends of the coils 22 and 28, 23 and 29, and 24 and 30 remote from the converters are connected together respectively, and are also connected, through the transformer 18 if it is used, to the A. C. circuit 10—11—12. The sets of connected coils, as 22 and 28, form the windings on the same legs of a three-phase transformer 31, as illustrated, but are oppositively disposed on such legs for currents between the A. C. and D. C. circuits. The turns of the two sets of windings of this transformer are proportioned inversely to the capacities of the converters to which they are respectively connected.

As the result of the arrangement above described, the transformer 31 produces little or no effect upon the flow of current between the A. C. and D. C. circuits as long as such current is divided in the proper proportion between the converters 15 and 16, for the ampere turns of the windings 22, 23, and 24 are equal and opposed to the ampere turns of the windings 28, 29, and 30 respectively. But upon any disproportionate division of the current between the two machines 15 and 16, the ampere turns of the windings 22, 23, and 24 become unequal to those of the windings 28, 29, and 30, and an electromotive force is induced in the windings having the smaller number of ampere turns tending to raise the current in such winding and thus to restore the equality between the ampere turns of the two sets of coils and the proportionate division of the current between the converters. When because of a disproportionate division of the current between the converters there is a tendency for the current to surge from one machine to another, such surging current traverses the two sets of transformer windings in series and the latter assist each other and offer a large impedance to such flow of current. This tends to prevent such surging current and almost completely overcomes any tendency to hunt.

For the purposes of this description one of the simplest cases has been taken, but the invention is not limited to the specific case described. It may be used when the plurality of rotary converters numbers other than two when properly grouped, and when they are other than three-phase converters. These modifications and many others come within the broad scope of our invention and are intended to be covered in the following claims.

What we claim as new is:

1. In combination, a source of polyphase alternating current, a direct current circuit, a plurality of rotary converters connected in parallel to said direct current circuit and supplied by said alternating current source, polyphase windings connected to the corresponding phase windings of the several rotary converters and connected in parallel to the alternating current source, said polyphase windings being inductively related to each other to produce equal and opposite inductive effects during the normal operation of the rotary converters.

2. In combination, an alternating current circuit, a direct current circuit, two rotary converters connected in parallel between said two circuits, said rotary converters being directly connected to said direct current circuit, and windings in corresponding leads of the connections between the two rotary converters and the alternating current circuit and in opposing inductive relation for the flow of current between the converters and such circuit.

3. In combination, an alternating current circuit, a direct current circuit, two rotary converters connected in parallel between said two circuits, a single core, and windings comprising sets of coils on said core and connected in corresponding leads of the connections from the two converters respectively to the alternating current circuit, the windings connected with the two converters being wound on the core so that the effects produced by the flow of current between the two converters respectively and the alternating current circuit tend to neutralize each other.

4. In combination, a three-phase alternating current circuit, a direct current circuit, two three-phase rotary converters connected in parallel between said two circuits, and a three-phase transformer having two sets of windings connected to each other and connected respectively in the leads from the two converters to the alternating current circuit and arranged to oppose each other for the flow of current between such circuit and the two converters.

5. In combination, an alternating current circuit, a direct current circuit, a plurality of rotary converters connected in parallel between said two circuits, said rotary converters being connected directly to said direct current circuit, a plurality of windings connected between the several rotary converters respectively and the alternating current circuit and arranged in inductive relation to one another so that they react among themselves to offer small impedance to the flow of current between the converters and the alternating current circuit and large impedance to the flow of current from converter to converter.

6. In combination, an alternating current circuit, two rotary converters connected to said alternating current circuit, windings through which such connections are made respectively, the windings associated with the two converters being in inductive relation to each other so that they each tend to neutralize each other for the flow of current between the alternating current circuit and the converters, and a direct current circuit to which the direct current ends of the converters are connected in parallel.

7. In combination, a polyphase alternating current circuit, a direct current circuit, two rotary converters arranged in parallel between said two circuits, and a pair of static transformer windings for each phase of the polyphase circuit, the two windings of each pair being connected to each other and in opposed inductive relation to each other and located in corresponding leads between the two converters respectively and the alternating current circuit.

8. In combination, a source of polyphase alternating current, a direct current circuit, a plurality of rotary converters connected in parallel to said direct current circuit and supplied by said alternating current source, a polyphase transformer between said source and said rotary converters, corresponding phase windings of the several rotary converters being connected in parallel through transformer windings disposed about the same magnetic path, said transformer windings being inductively related to each other to produce a condition of neutral magnetization in said magnetic path during normal operation of said rotary converters and being so connected that the path between said rotary converters on the supply side includes such transformer windings on the same core in series.

9. In combination, an alternating current circuit, a direct current circuit, a plurality of dynamo electric machines connected in parallel to said direct current circuit, and windings connected to the armature windings of said dynamo electric machines and connected in parallel to the alternating current circuit, said first windings being inductively related to each other to produce equal and opposite inductive effects during the normal operation of said dynamo electric machines.

10. In combination, an alternating current circuit, a plurality of translating devices connected to said circuit, a plurality of transformer windings disposed on a common core and connected in parallel between said circuit and corresponding windings on said translating devices, a separate electrical connection between said corresponding windings of said translating devices, said transformer windings being so proportioned and inductively related to each other as to produce a neutral magnetic effect in said core during the normal operation of said translating devices, and being so connected that the electrical path therethrough from one translating device to another is through both of said transformer windings in series.

Milwaukee, Wis., May 10, 1910.

In testimony whereof we affix our signatures, in the presence of two witnesses.

LOUIS E. BOGEN.
LOUIS C. NICHOLS.

Witnesses:
 GEO. B. SCHLEY,
 CHAS. L. BYRON.

Copies of this patent may be obtained for five cents each, by addressing the "Commissioner of Patents, Washington, D. C."